July 2, 1957  F. D. BARBER  2,797,914
SPRING GROUP AND STABILIZER UNIT FOR RAILWAY CAR TRUCKS
Filed March 4, 1952  2 Sheets-Sheet 1

INVENTOR.
Franklin D. Barber
BY Harvey M. Gillespie
Atty.

July 2, 1957  F. D. BARBER  2,797,914
SPRING GROUP AND STABILIZER UNIT FOR RAILWAY CAR TRUCKS
Filed March 4, 1952  2 Sheets-Sheet 2
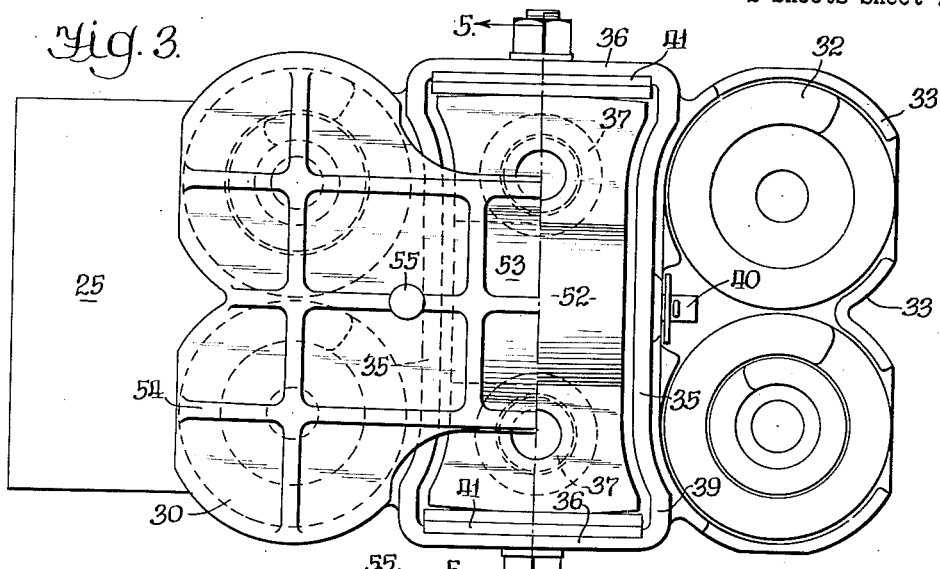
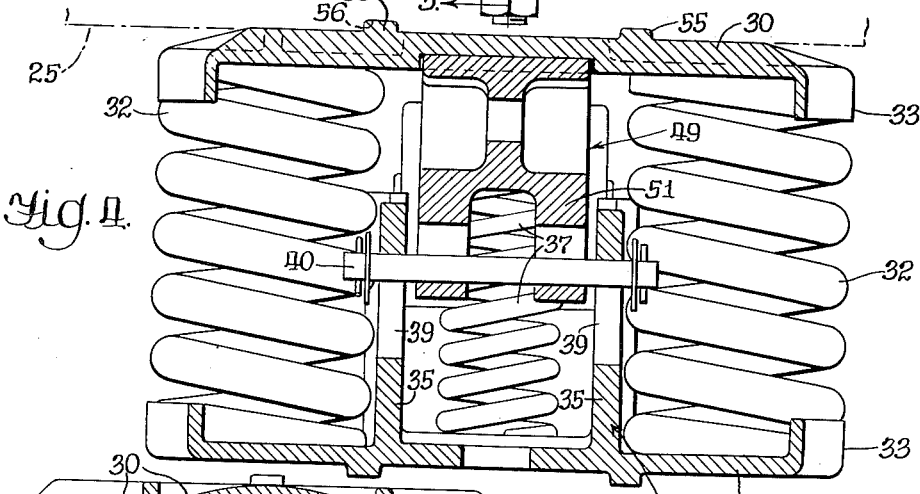
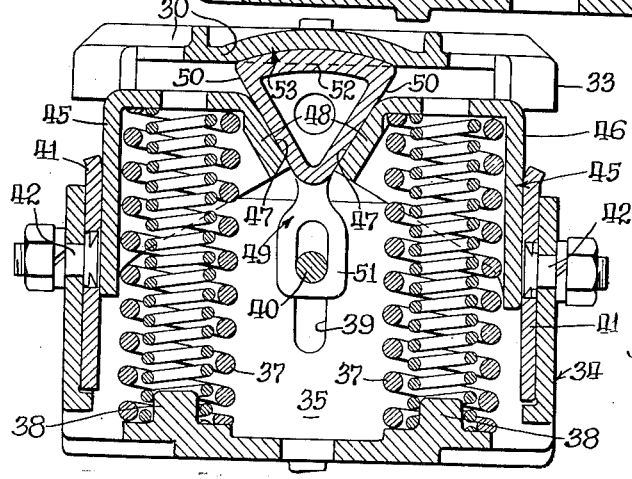
INVENTOR.
Franklin D. Barber
BY Harvey M. Gillespie
Atty United States Patent Office 2,797,914
Patented July 2, 1957

2,797,914

SPRING GROUP AND STABILIZER UNIT FOR RAILWAY CAR TRUCKS

Franklin D. Barber, Flossmoor, Ill., assignor to Standard Car Truck Company, Chicago, Ill., a corporation of New Jersey Application March 4, 1952, Serial No. 274,740

6 Claims. (Cl. 267—9)

The present invention relates to an improved spring group and stabilizer unit for railway car trucks and includes a composite assembly of load springs and cooperating friction stabilizing mechanism including friction wedge members and stabilizer springs therefor adapted to be installed in a railway car truck as a pre-assembled unit. Devices of this general character are designed for installation in a car truck either as original equipment, as a replacement unit for original equipment, or as a conversion unit to convert non-stabilized trucks into stabilized trucks.

Numerous forms of spring group stabilizer units are currently in use but these are found to possess certain limitations in that certain elements of the composite assembly are subjected to undue stresses because of certain movements of the truck side frames with respect to each other. The spring group stabilizers now in use ordinarily comprise self-contained assemblies of upper and lower spring followers in the form of plates between which are disposed the usual load springs. The stabilizing action imposed on the load springs is usually effected by means of one or more wedge members formed integrally with the top follower plate or otherwise fixed rigidly thereto, and positioned to exert wedging pressure against inclined faces of cooperating friction shoes so as to press the shoes against friction faces and thereby retard downward movement of the upper follower plate and stabilize the compression and recoil of the load springs.

Stabilizers of the type set forth above are mounted, one in the bolster window of each truck side frame, in such manner that the opposite ends of the bolster seat upon the top follower plates of the stabilizing units at opposite sides of the truck. As a consequence, the top follower plates are constrained to follow the movements of the bolster while the lower spring plates are constrained to follow the movements of the truck frames on which they are mounted. It has been found that the top plates of spring group stabilizer units are subjected to several types of motion relative to the car frame which impose undue strains on the top plate and its integral wedge and interfere with the desired coaction of the parts. These movements include fore and aft rocking movements of the top and bottom follower plates as an incident to the fore and aft rocking movement of the side frames relative to the truck bolster as the truck wheels pass over undulations in the trackway; fore and aft shifting of the top plate or follower relative to the bottom plate as an incident to sudden stopping or jerking of the car; and the twisting or turning of the top follower plates and its integral wedge about a vertical axis relative to the bottom plate as a result of the angular positions assumed by the truck bolster relative to the side frames when a side frame at one side of a car advances or lags relative to the side frame at the other side of the car.

During each of the above movements of the top plate relative to the bottom plate, the top plate tends to remain fixed to the bolster while the bottom plate remains fixed to the truck side frame. Consequently the above movements or tendency of movement of the top plate or follower relative to the bottom plate tends to move the wedge member, which is formed integrally with the top plate, to various angular positions, whereby its flat wedging faces are moved out of flat surface engagement with the friction shoes of the stabilizing structure and thereby nullify or material reduce the snubbing function of the stabilizer unit.

The said twisting or turning of the top plate or follower about a vertical axis relative to the bottom plate may result from several causes, but most often results from recurrent oscillatory movement of the truck wheels transversely of the railway track. In such case a larger diameter of the cone-shaped tread of the wheels at one side of the truck ride on the track rail and a smaller diameter of the cone-shaped tread of the wheels at the other side of the truck ride on the other track rail. As a consequence, the wheels having the larger diameter contacting the track rail at one side of the truck will move slightly ahead of the wheels at the other side of the truck. This condition is corrected from time to time by oscillation of the wheels in a reverse direction transversely of the trackway. However, the forward and back movement of the truck side frames at opposite sides of the truck is a recurrent condition and therefore produces oscillations of the truck bolster about its vertical central axis. As a result of these oscillatory movements of the truck bolster, the top follower plate of the stabilizer unit is turned about a vertical axis relative to the truck side frame and relative to the lower follower plate. Such movement of the top follower necessarily moves the wedge means formed integrally therewith and thereby positions the wedge means at objectionable angles relative to the cooperating friction shoes. This condition places thrust forces at diagonal corners of the wedge means carried by the top follower plate and thereby materially reduces the area of contact of its wedge faces with the cooperating wedge faces of the friction shoes.

The present invention is designed to overcome the above noted limitations that are attendant upon the use of such wedge type stabilizer units and toward this end it contemplates the provision of a spring group stabilizer unit in which the top follower and the wedge element or elements associated therewith are allowed freedom of movement relative to each other during relative movements of the truck side frames in said fore and aft directions and which will also permit limited oscillatory movements of the top follower relative to the side frame about a vertical axis without reducing the surface engagement of the cooperating wedge elements. The improved spring group stabilizer unit of the present invention also is constructed so that limited displacement of the top follower in a longitudinal direction relative to the truck side frame may take place without imposing undue strains on the follower plate at its point of contact with its associated wedge member and at the same time insure the maintenance of flat engagement of all cooperating wedge faces.

A preferred embodiment of the invention is illustrated in the accompanying drawings wherein:

Fig. 1 is a side elevational view of a railway car truck to which the improved spring group stabilizer unit of the present invention has been applied and diagrammatically illustrating the manner in which an oscillating condition of the truck side frame in a fore and aft direction may be initiated and also schematically illustrating the manner in which the present stabilizer unit will effectively accommodate such an oscillatory condition. In this view, the stabilizer unit has been shown in vertical cross section;

Fig. 3 is an enlarged top plan view of the stabilizer unit. In this view a portion of the top follower plate has been broken away to more clearly reveal the nature of the invention;

Fig. 4 is a vertical sectional view taken substantially centrally through the unit of Fig. 3; and Fig. 5 is a sectional view taken substantially along the line 5—5 of Fig. 3.

Figure 1:
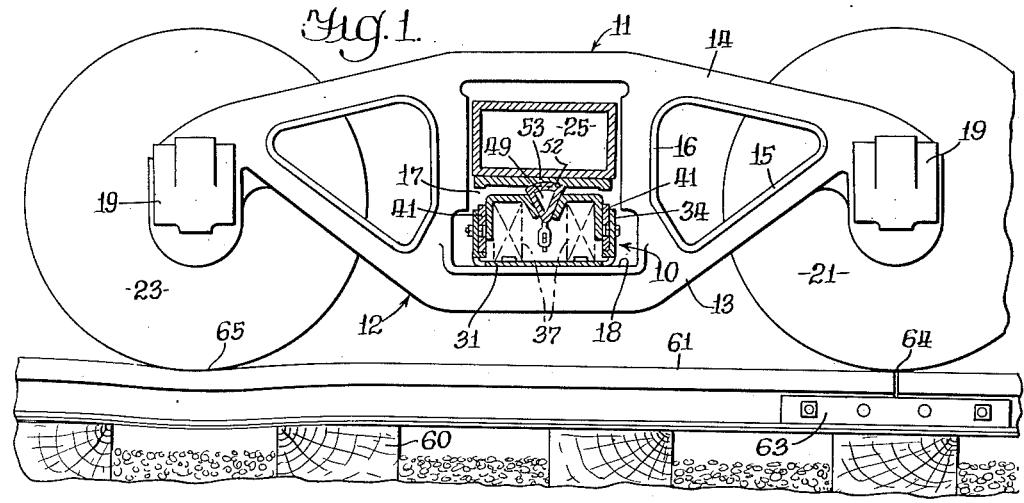
Figure 2:
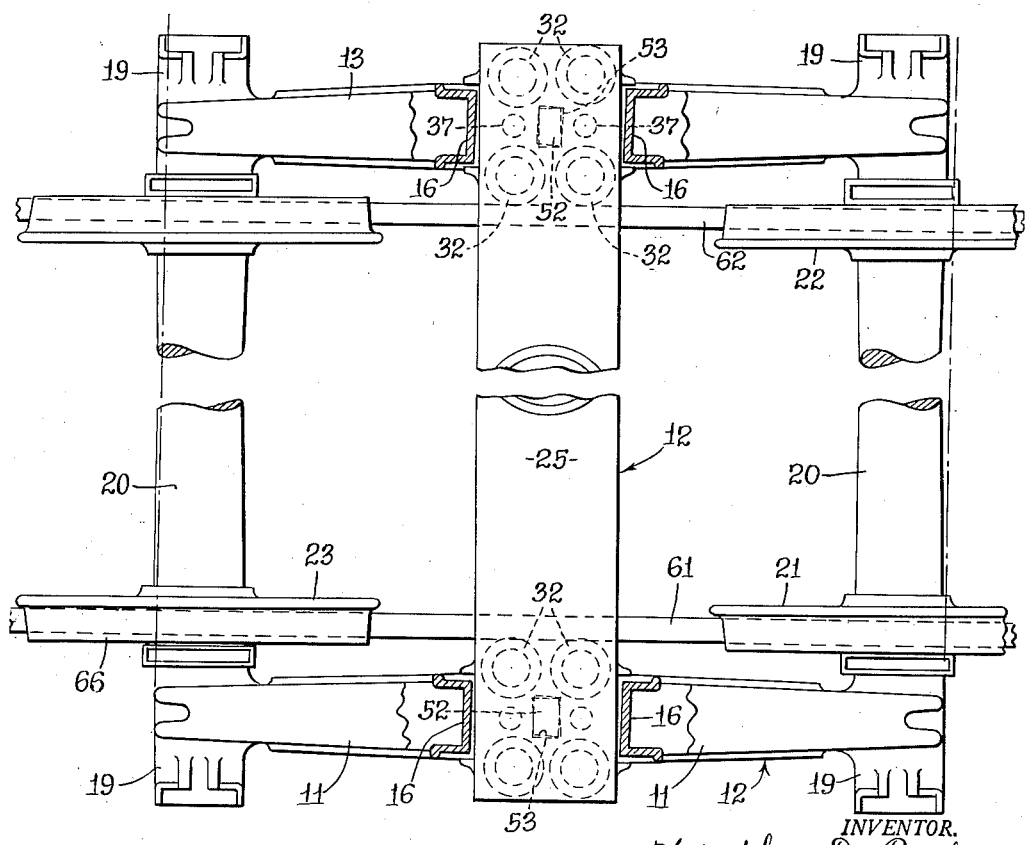
Fig. 2 is a fragmentary plan view of the structure shown in Fig. 1 schematically illustrating the manner in which an oscillatory condition of the bolster may be initiated.

Referring now to the drawings in detail and particularly to Figs. 1 and 2, the improved spring group stabilizer unit of the present invention is designated in its entirety at 10 and is shown in Fig. 1 in some detail as being operatively installed in one of the side frames 11 of a railway truck 12. The other side frame 13 appears in Fig. 2 and may also have associated therewith one of the spring group stabilizer units 10. The two side frames 11 and 13 are of conventional design and each includes a tension member 14, compression member 15, and connecting columns 16. The members 14, 15 and 16 define therebetween a bolster opening or window 17, the lower regions of which provide a spring seat 18. Front and rear journal boxes 19 are carried in the usual manner at the opposite ends of the side frames 11 and 13 and are adapted to enclose therein the usual axle journals (not shown) formed on the front and rear axles 20. The front axle carries the usual right and left flanged car wheels 21 and 22 respectively, while the rear axle has associated therewith right and left flanged car wheels 23 and 24 respectively. The usual truck bolster 25 extends transversely between the side frames 11 and 13 and extends into the bolster openings 17 thereof on opposite sides of the truck.

The arrangement of parts thus far described is purely conventional and no claim is made herein to any novelty associated therewith, the novelty of the present invention residing rather in the construction of the spring group stabilizer unit which will be more fully described, illustrated and claimed.

Referring now additionally to Figs. 3, 4 and 5, the improved spring group stabilizer unit 10 involves in its general organization an upper spring plate or top follower 30 and a lower spring plate 31 between which are interposed a series of four load springs 32 each of which is arranged adjacent a corner of the unit. The top follower 30 and lower spring plate 31 are each provided with marginal retaining flanges 33 to retain the coiled load springs 32 in position between the plates and prevent displacement thereof.

The lower spring plate 31 may be in the form of a casting of tray-like design from which there extends upwardly in the medial regions thereof a generally rectangular wall 34 providing a box-like, open-top casing having front and rear transverse wall portions 35 and somewhat shorter side wall portions 36 and adapted to partially enclose therein a pair of dual coil stabilizer spring assemblies 37. The lower spring plate is provided with a pair of upstanding integral centering bosses or lugs 38 which are disposed within the generally rectangular casing wall 34 and which are spaced apart and serve to locate the lower ends of the dual stabilizer spring assemblies 37. A pair of aligned slots 39 are formed in the front and rear wall portions 35 in the medial regions thereof and receive therethrough a longitudinally extending tie rod or pin 40, the nature and function of which will become clear presently.

As shown in Figs. 3 and 5, each side wall portion 36 of the casing wall 34 has secured to the inner face thereof a wear plate 41, each plate being secured in position on the wall portion by means of a clamping bolt and nut assembly 42 in which the bolt head is preferably countersunk in the material of the wear plate. This method of attachment of the wear plates to the side walls 36 facilitates replacement of worn wear plates when necessary.

Mounted on the upper ends of the stabilizer springs 37 at opposite sides of the box-like casing structure 34 are a pair of floating friction shoes 45 in the form of wedges which are generally of inverted cup-shape configuration and which are telescopically received over the upper ends of the spring assemblies 37. Each wedge or friction shoe is provided with a vertical friction face 46, adapted to bear against the inner face of its respective wear plate 41 and with a pair of opposed transversely extending inclined face portions 47 presenting an inclined surface 48. The two surfaces 48 of the friction members 45 are opposed to each other as shown in Fig. 5 and define therebetween a trough-like depression adapted to receive therein the lower regions of a central or intermediate wedge member 49 which is generally of triangular shape in cross section and which presents outwardly facing inclined cam surfaces 50 which constitute wedge surfaces that bear against the cam surfaces 48 of the friction shoes 45 and serve to apply increments of lateral thrust to these shoes when a downward thrust is applied to the central wedge member 49. Integrally formed with the lower edge or apex region of the central wedge member 49 is a loop member 51 through which the longitudinally extending pin 40 extends and in which it is slidable, thus providing a lost motion connection for maintaining the various parts of the package unit thus far described in their assembled relationship. Preferably the loop member 51 is so fashioned that a slight degree of downward tension is applied to the central wedge member 49, so that the stabilizer springs are under slight compression when there is no load upon the central wedge member.

As shown in Figs. 4 and 5, the upper wall or crown portion 52 of the wedge member 49 is arcuate in cross section, the arc representing substantially a true circle fragment and the medial region of the top follower 30 is provided with a complementary crown portion 53, the inner surface of which bears against the upper surface of the crown portion 52 of the central wedge member 49 when the package unit is assembled in the truck side frame 11 or 13 as the case may be. The upper face of the top follower 30 is provided with a series of longitudinal and transverse reinforcing webs 54 (Fig. 1) and a plurality of lugs 55 extending upwardly from the surface of the follower fit into corresponding recesses 56 formed in the underneath side of the bolster 25 to prevent relative shifting movement between the two parts so that the top follower 30 is at all times constrained to follow the movements of the bolster.

Some of the known causes whereby oscillation of a side frame such as the frame 11 will take place in a fore and aft direction about a horizontal axis are illustrated schematically in Fig. 1. The manner in which the use of the present package unit 10 will nullify the deleterious effect such oscillation ordinarily has on the snubbing action of conventional stabilizing package units is also portrayed somewhat schematically in this view.

Ordinarily, over any given extent of track adjacent crossties 60 which support the rails 61 and 62 (see also Fig. 2) are more or less uniformly spaced from each other. The rail sections are manufactured in standard lengths and thus the rail joints, represented by the rail joint bar 63 and adjacent rail ends 64, are equally spaced apart. It sometimes happens that the wheels bounce as they pass over the spacings at the meeting ends of railroad rails and thereby impart upward rocking movements to the side frames of the truck. Also the downwardly flexing of the railroad rails 61, 62 between adjacent crossties 60 as the car wheels move along a rail. Such downward deflection of the rails beneath the front and rear wheels of a car truck imparts vertical rocking movement of the truck side frames substantially as shown in Fig. 1. Because of the fact that in known types of package units the central wedge member corresponding to the member 49 is rigidly attached to the top follower of these installations, such "rocking" of the side frame in a fore and aft direction will greatly modify and render ineffectual the ordinary intended snubbing action of the stabilizer devices. The relative rocking that occurs between the follower-attached central wedge and the friction members apply disproportionate stresses on the top follower at the junction of the central wedge member.

In the present instance, the central wedge member 49 is not rigidly attached to the top follower 30 and the two mating crown surfaces 52 and 53 (Fig. 5) of these members are free to move relative to each other, with the surface 53 riding or sliding on the surface 52, so that such an oscillatory condition as that just described will be accompanied by a shifting of the crown surface 52 beneath the crown surface 53 without appreciable resultant application of thrust on either friction member 45. In this manner the central wedge member 49 remains available to assimilate any downward thrust of the top follower 30 in the usual manner of operation.

In Fig. 2 one of the known causes of lengthwise oscillation of the truck side frames 11 and 13 has been illustrated and the response of the present unit 10 to such oscillation schematically portrayed. When side sway of the truck 12 including the axles 20 relative to the roadbed takes place due to any cause whatsoever, the cone-shaped tread 66 of the wheels 21 and 23, for example, may shift on the rail 61 so that the large diameter of the wheels become effective tractionally. At the same time the treads 66 of the wheels 22 and 24 will shift on the rail 62 to render the small diameter of these wheels tractionally effective. The opposed wheels being connected through the axles 20, an accelerated movement of the side frame 11 will take place relative to the side frame 13 to advance the side frame 11 and relatively retard the side frame 13 and thus produce a counterclockwise movement of the bolster 25 about a vertical axis as viewed in Fig. 2. As the swaying action continues, oscillation sets in and a reverse condition takes place wherein the wheels 22 and 24 become tractionally effective on a large diameter while the wheels 21 and 23 become effective on a small diameter so that the side frame 13 advances on the side frame 11. Such oscillations are accompanied by oscillation of the bolster 25 about a vertical axis within the space allowed by the bolster windows 17. If, in such case, the central wedge member were rigidly attached to the top follower the central wedge would be turned slightly about a vertical axis with respect to its cooperating wedge members. In the present structure, however, turning movement of the bolster 25 in one direction or the other relative to the side frame 11 as indicated in Fig. 2 is restrained to a limited extent by the nesting of the crowned portion of the wedge 49 within the pocket 52. However, substantial angular movement of the truck bolster will turn the top follower about a vertical axis relative to the central wedge and thereby permits the wedging faces 47, 50 to remain in flat surface contact. During the turning movement of the top follower 30 relative to the central wedge 49, the diagonal corners of the crown-shaped pocket 52 will move out of angular register with the crown surface 53 as shown in Fig. 2.

While the invention is shown in one preferred embodiment, it will be obvious from the within disclosure that variations in the structure may be made without departing from the spirit of the invention. Therefore it should be understood that the present invention contemplates all such modifications which come within the scope of the appended claims.

I claim:

1. A spring group stabilizer unit designed for insertion in a bolster window of a car truck side frame to support one end of a truck bolster and comprising a top follower having a downwardly facing upwardly curved crown surface and a bottom plate spaced from each other, load springs interposed between said follower and plate, opposed friction walls extending upwardly from said lower plate on opposite sides thereof toward said top follower and having inwardly presented friction surfaces, a pair of floating friction shoes confined between said friction walls and each presenting a friction surface to one of said inwardly presented friction surfaces, a stabilizer spring interposed between each friction shoe and said bottom plate, said friction shoes being formed with downwardly and inwardly inclined opposed surfaces defining therebetween a V-shaped void, and a generally V-shaped central wedge member seated within said void and having outwardly presented inclined surfaces in wedging engagement with the inclined opposed surfaces on said friction shoes, said central wedge member having an upwardly curved crown surface bearing against and in sliding engagement with said downwardly presented crown surface of the top follower when the package unit is installed within the bolster window.

2. A spring group stabilizer unit as claimed in claim 1 in which the crown surfaces on said top follower and central wedge member are circular in cross section and have equal radii of curvature.

3. A spring group stabilizer unit designed for insertion in a bolster window of a car truck side frame to support one end of a truck bolster comprising a top follower having a downwardly facing curved crown surface and a bottom plate spaced from said follower, load springs interposed between said follower and plate, opposed friction walls extending upwardly from said lower plate on opposite sides thereof toward said top follower and having inwardly presented friction surfaces, a pair of floating friction shoes confined between said friction walls and each presenting a friction surface to one of said inwardly presented friction surfaces, a stabilizer spring interposed between each friction shoe and said bottom plate, a central wedge member disposed between said friction shoes and having wedging engagement therewith and serving to spread said friction shoes outwardly when a downward thrust is exerted upon the wedge member, said wedge member having an upwardly presented curved crown surface which is arcuate in cross section bearing against and in sliding engagement with the downwardly facing curved crown surface of the top follower when the spring group stabilizer unit is installed within the bolster window.

4. A spring group stabilizer unit as claimed in claim 3 in which the crown surface on the top follower and the crown surface on the central wedge member are circular in cross section and of equal radii of curvature.

5. A spring group stabilizer unit of the character described comprising a top follower having a downwardly facing arcuate crown surface which is of circular cross section, a bottom casting spaced from said follower, load springs interposed between said follower and casting, an upstanding generally rectangular wall formed on said casting and having opposed side walls, a wear plate secured to the inner face of each side wall, a pair of stabilizer springs extending upwardly within said rectangular wall, an inverted cup-shaped friction shoe telescopically received over the upper end of each stabilizer spring, each friction shoe having a friction surface thereon cooperating with one of said wear plates, said friction shoes being formed with downwardly and inwardly inclined opposed surfaces defining therebetween a generally V-shaped void, and a central wedge member, generally triangular in vertical cross section, seated within said void and having outwardly presented inclined surfaces cooperating with said opposed inclined surfaces on the friction shoes, said central wedge member having an upwardly presented arcuate crown surface which is of circular cross section, said latter crown surface bearing against the downwardly facing crown surface of said top follower when the spring group stabilizer unit is installed in a bolster window.

6. A spring group stabilizer unit of the character described comprising a top follower having a downwardly facing arcuate crown surface which is of circular cross section, a bottom casting spaced from said follower, load springs interposed between said follower and casting, an upstanding generally rectangular wall formed on said casting and having a front wall and an opposing rear wall and opposed side walls, a wear plate secured to the inner face of each side wall, a pair of stabilizer springs extending upwardly within said rectangular wall, an inverted cup-shaped friction shoe telescopically received over the upper end of each stabilizer spring, each friction shoe having a friction surface thereon cooperating with one of said wear plates, said friction shoes being formed with downwardly and inwardly inclined opposed surfaces defining therebetween a generally V-shaped void, a central wedge member, generally triangular in vertical cross section, seated within said void and having outwardly presented inclined surfaces cooperating with said opposed inclined surfaces on the friction shoes, said central wedge member having an upwardly presented arcuate crown surface which is of circular cross section, said latter crown surface bearing against the downwardly facing crown surface of said top follower when the package unit is installed in a bolster window, a tie rod extending between said front and rear wall below said wedge member, and a lost motion connection between said tie rod and wedge member serving to retain the latter in position in said void.

References Cited in the file of this patent
UNITED STATES PATENTS

| | | |
|---|---|---|
| 1,700,260 | Haseltine | Jan. 29, 1929 |
| 1,942,188 | Schmidt | Jan. 2, 1934 |
| 2,060,370 | Hall | Nov. 10, 1936 |
| 2,065,992 | Barrett | Dec. 29, 1936 |
| 2,118,006 | Couch | May 17, 1938 |
| 2,279,914 | Cottrell | Apr. 14, 1942 |
| 2,398,621 | Cottrell | Apr. 16, 1946 |
| 2,463,373 | Gadbois | Mar. 1, 1949 |
| 2,469,549 | Dath | May 10, 1949 |
| 2,483,181 | Clasen | Sept. 27, 1949 |
| 2,483,184 | Cottrell | Sept. 27, 1949 |
| 2,665,127 | Leese | Jan. 5, 1954 |